(12) United States Patent
Li et al.

(10) Patent No.: US 10,949,551 B2
(45) Date of Patent: Mar. 16, 2021

(54) POLICY AWARE UNIFIED FILE SYSTEM

(71) Applicants: Huawei International Pte. Ltd., Singapore (SG); National University of Singapore, Singapore (SG)

(72) Inventors: Xiaolei Li, Singapore (SG); Roland Hock Chuan Yap, Singapore (SG); Zhenkai Liang, Singapore (SG)

(73) Assignees: Huawei International Pte. Ltd., Singapore (SG); National University of Singapore, Singapore (SG)

( * ) Notice: Subject to any disclaimer, the term of this patent is extended or adjusted under 35 U.S.C. 154(b) by 292 days.

(21) Appl. No.: 15/881,266

(22) Filed: Jan. 26, 2018

(65) Prior Publication Data
US 2018/0150640 A1 May 31, 2018

Related U.S. Application Data

(63) Continuation of application No. PCT/SG2016/050147, filed on Mar. 28, 2016.

(30) Foreign Application Priority Data

Jul. 27, 2015 (SG) .......................... 10201505822U

(51) Int. Cl.
*H01L 29/04* (2006.01)
*G06F 21/00* (2013.01)
(Continued)

(52) U.S. Cl.
CPC ........ *G06F 21/604* (2013.01); *G06F 21/6218* (2013.01)

(58) Field of Classification Search
CPC .. G06F 21/604; G06F 21/6218; G06F 16/188; G06F 16/17
See application file for complete search history.

(56) References Cited

U.S. PATENT DOCUMENTS 6,195,650 B1 * 2/2001 Gaither ................. G06F 16/192
7,386,559 B1 6/2008 Desai et al.
(Continued)

FOREIGN PATENT DOCUMENTS

CN      1904901 A    1/2007
CN    101000616 A    7/2007
(Continued)

OTHER PUBLICATIONS

Dhumbumroong et al., "Personal Cloud Filesystem: A Distributed Unification Filesystem for Personal Computer and Portable Device," 2011 Eighth International Joint Conference on Computer Science and Software Engineering (JCSSE), XP031949364, pp. 58-62, Institute of Electrical and Electronics Engineers, New York, New York (May 2011).
(Continued)

*Primary Examiner* — Lisa C Lewis
(74) *Attorney, Agent, or Firm* — Leydig, Voit & Mayer, Ltd.

(57) ABSTRACT

A system and method for operating a policy aware unification file system within a computer system that takes into account the security requirements of each file system as each file system is unified into the unified file system are provided. As the application is compatible with existing run time policies of files and directories within each file system that is to be unified, the application supports the enforcement of security policies or requirements of each file and/or directory that has been unified into the unified file system.

18 Claims, 7 Drawing Sheets

(51) Int. Cl.
  *G06F 21/60* (2013.01)
  *G06F 21/62* (2013.01)

(56) References Cited

U.S. PATENT DOCUMENTS

| | | | | |
|---|---|---|---|---|
| 2002/0162013 | A1* | 10/2002 | Burnett | G06F 21/6218 |
| | | | | 726/27 |
| 2004/0091114 | A1* | 5/2004 | Carter | G06F 21/606 |
| | | | | 380/259 |
| 2004/0205152 | A1* | 10/2004 | Yasuda | G06F 16/184 |
| | | | | 709/217 |
| 2004/0244013 | A1* | 12/2004 | Yumoto | G06F 13/4013 |
| | | | | 719/321 |
| 2006/0136910 | A1 | 6/2006 | Brickell et al. | |
| 2006/0253440 | A1* | 11/2006 | Reed | G06F 16/174 |
| 2010/0257218 | A1* | 10/2010 | Vassilev | G06F 16/188 |
| | | | | 707/823 |
| 2011/0145296 | A1* | 6/2011 | Ellison | G06F 16/13 |
| | | | | 707/800 |
| 2014/0156695 | A1 | 6/2014 | Callaghan | |
| 2018/0260412 | A1* | 9/2018 | Avati | G06F 16/182 |

FOREIGN PATENT DOCUMENTS

| | | |
|---|---|---|
| CN | 101836184 A | 9/2010 |
| CN | 101840408 A | 9/2010 |
| CN | 103150402 A | 6/2013 |
| CN | 103226592 A | 7/2013 |

OTHER PUBLICATIONS

"Unioning file systems: Implementations, part 2,", LWN.net, Internet Citation, XP055271393, (Apr. 2009).

"UnionFS," Wikipedia, Internet citation, XP002625502, pp. 1-2 (Jun. 11, 2008).

You Jinyuan, "Principles of Windows operating system," (2001). With English translation.

* cited by examiner

POLICY AWARE UNIFIED FILE SYSTEM

CROSS-REFERENCE TO RELATED APPLICATION

This application is a continuation of International Application No. PCT/SG2016/050147, filed on Mar. 28, 2016, which claims priority to Singapore Patent Application No. SG10201505822U, filed on Jul. 27, 2015. The disclosures of the aforementioned applications are hereby incorporated by reference in their entireties.

FIELD OF THE APPLICATION

Embodiments of the application relate to a system and method for operating a policy aware unified file system within a computer system.

BACKGROUND

Presently, computer systems utilize file systems to manage files that are stored within storage devices such as hard disk drives, solid state disks, memory cards, etc. Most file systems (which we also call branches) organize the directories contained within a hierarchical structure or a tree format. For example, the most basic directory within such a branch would be the root directory, which would in turn have a plurality of sub-directories. Each of these sub-directories would then in turn have their own sub-directories. As more sub-directories are added, the size of the hierarchal tree would then expand accordingly. Each file stored within this file system is typically referenced by a pathname which sets out the hierarchical sequence of directories that lead to the file. For example, a file, "example.txt", that is referenced by a pathname such as "/directory1/backup/example.txt" would be stored within a directory named "backup". The directory named "backup" in turn would be stored within a directory named "directory1". As the "directory1" directory is the last named directory in the pathname, this would mean that "directory" is located at the root directory of the file system.

Each file within the file system will typically comprise of two parts. The first part would comprise the file's disk blocks that contain the actual data stored by the file and the second part would be the file's metadata that contains all the necessary information for accessing and managing the file. In UNIX based file systems, a file's metadata is commonly stored in an index node which is usually referred to as an "inode". The index node contains all the necessary information about a particular file such as the ownership and permissions of the file (read, write, execute permissions), file types, the addresses of the data blocks of the file, the size of the file, the dates and times of when the file was created, accessed or modified, etc. Furthermore, from the index node number of a file, a file system driver may gain access to the contents of the index node, including the location of the file to gain access to the file.

Each directory within the UNIX based file system may also include metadata that maps the names of the files and sub-directories in that directory to their corresponding index nodes. As such, a software application may access a file within a directory if the application is provided with the reference to the file, such as the pathname of the file. The application may then traverse the hierarchy of directories until the application arrives at the location of the file and the directory's metadata may be consulted to map the name of the file to the file's corresponding index node. The file's index node may then be accessed by the file system driver to allow the application to gain access to the file. For example, as the address of the data blocks of the file is stored within the file's index node, the application may utilize this information to access the file's stored data. Further, if the index node of a file indicates that the file has been assigned with a read-only permission, the application will only be accorded with the read-only permission when accessing the file's stored data. Thus, when a file is accessed by an application, the means of accessing the file and the level of access accorded to the application is determined by the information contained within the file's index node.

A convenient way of managing a plurality of separate file systems is to form a single coherent file system. An example of a single coherent file system known in the art would be a unification file system that transparently overlays files and directories of separate file systems into a single unified file system. This means that after a group of separate file systems have been unified, it would appear to a software application that all the files and directories contained within the group of separate file systems are now contained within a single unified file system. In other words, existing unification file systems can implement the unification of a group of separate file systems such that a software application need not be aware that the files appearing in the unified file system are actually located in separate file systems even if the file is subsequently accessed by the application.

For example, assume that a file system named "/root_A" has been unified with a separate file system named "/root_B" to form unified file system named "/unif". This would mean that when an application requests to access a file "sample.txt" contained within the "/root_A" file system, e.g. "/root_A/sample.txt", the application may actually request to access the file using the pathname "/unif/sample.txt" instead. The unification file system would automatically intercept and subsequently redirect the request to the "sample.txt" file in the "/root_A" file system.

An existing file system service for mounting a mix of read-only and read-write file systems that may be implemented on Linux operating systems is "Unionfs". Unionfs allows the merging of the contents of several file systems into a single coherent file system while keeping the physical files and directories of these file systems separate. In Unionfs, each file system is assigned with a priority. A file system having a higher priority overrides a file system with a lower priority when the file systems are unified. This means that if two files with the same name exist in two separate file systems, the file contained within the file system with the higher priority will be presented to the software application while the other file will be hidden. Contents of directories which have the same path within the single coherent file system will be seen together in a single merged directory within the new coherent file system.

Existing unification file system services typically merge separate file systems into one unified view in a transparent manner. This means that when separate file systems are merged, the individual security policies for each file system are not taken into account. Furthermore, when a file system with higher priority overrides a file system with lower priority, files with similar names in these two file systems would tend to adopt the security policy of the file system with the higher priority, even though the file in file system with the lower priority might have a more stringent security requirement. As such, it can be said that existing unification file system services are not wholly compatible with the security requirements associated with the various file systems. This may result in the unexpected granting of access to sensitive documents within the unified file system or the sudden disappearance of files from the unified file system. Further, existing unification file system services tend to implicitly unify files and/or directories from various file systems without providing information about the file system from which the file and/or directories originated from. This can produce an inconsistent file system view to software applications and as a result, makes the unified file system incompatible with security policies that require fine-grained access control over files in the unified file system.

For the above reasons, those skilled in the art are constantly striving to come up with a system and method that allows multiple separate file systems to be unified into a single coherent file system without sacrificing each file system's individual security policy. Further, the unified file system should also include metadata that sets out the relationship between the various file systems that have been unified to form the unified file system.

SUMMARY APPLICATION

The above and other problems are solved and an advance in the art is made by systems and methods provided by embodiments in accordance with the application. A first advantage of embodiments of systems and methods in accordance with the application is that the resulting unified file system supports security policies of each branch that has been unified thereby improving the overall security of the unified file system.

A second advantage of embodiments of systems and methods in accordance with the application is that metadata is created to map the files that are displayed in the unified file system with the files from which these files originated from, i.e. mapped with the files of the different branches that have been unified.

A third advantage of embodiments of systems and methods in accordance with the application is that the unified file system is able to support both branch policies and unification action policies.

The above advantages are provided by embodiments of a system in accordance with the application operating in the following manner. The system has a processing unit and a non-transitory medium readable by the processing unit. The medium is configured to store instructions that when executed by the processing unit, cause the processing unit to unify existing branches in the computer system to create the unified file system wherein the unified file system includes branch policies of the unified existing branches and a unification policy of the unified file system, to receive a request from an application to access the unified file system, and to determine if the request satisfies the unification policy of the unified file system and the corresponding branch policies. If the request satisfies the unification policy and the corresponding branch policies, the instructions cause the processing unit to allow the application to access the unified file system.

In accordance with embodiments of the application, the instructions to unify the existing branches in the computer system to create the unified file system comprises instructions for directing the processing unit to select a branch from the existing branches in the computer system, to retrieve a branch policy associated with the selected branch and retrieve a unification policy associated with the unified file system, to create virtual files in the unified file system for all the files in the selected branch wherein each created virtual file corresponds to a file in the selected branch, and to apply the retrieved branch policy associated with the selected branch and the retrieved unification policy to all the virtual files created for the files in the selected branch. The instructions then cause the processing unit to repeat the steps set out above until all branches in the computer system have been selected.

In accordance with embodiments of the application, the instructions to unify the existing branches in the computer system to create the unified file system comprises instructions for directing the processing unit to select a branch from the existing branches in the computer system, to retrieve a branch policy associated with the selected branch and retrieve a unification policy associated with the unified file system, to select a file from the branch, determine if the selected file satisfies the retrieved branch policy associated with the selected branch and satisfies the retrieved unification policy, and if the selected file satisfies the retrieved branch policy associated with the selected branch and the retrieved unification policy, the instructions then cause the processing unit to create a virtual file in the unified file system for the selected file. The instructions then cause the processing unit to repeat the steps set out above until all the files in the selected branch have been selected and all branches in the computer system have been selected.

In accordance with embodiments of the application, the unified file system is created in a different location within the computer system from the locations of the existing branches in the computer system.

In accordance with embodiments of the application, the instructions to create the virtual file in the unified file system for the selected file further comprises instructions for directing the processing unit to create a symbolic link or a dummy file to the selected file, to add the symbolic link or the dummy file to the unified file system, and to update a metadata of the unified file system, wherein a link relationship between the symbolic link or the dummy file with the selected file is recorded in the metadata.

In accordance with embodiments of the application, the instructions further comprise additional instructions for directing the processing unit to receive from the application a query request to query link relationships of virtual files in the unified file system, to use metadata of the unified file system to obtain the link relationships between files in a branch of the computer system and their corresponding virtual files in the unified file system, and to provide the link relationships to the application.

In accordance with embodiments of the application, the instructions further comprise additional instructions for directing the processing unit to determine if the request relates to an access of an existing file in the unified file system and if the request relates to the access of an existing file in the unified file system, to direct the processing unit to determine if the request to access an existing file satisfies a unification policy and a branch policy associated with the existing file to be accessed; and if the request to access an existing file satisfies the unification policy and the branch policy of the existing file to be accessed, to allow the application to access the existing file within the unified file system.

In accordance with embodiments of the application, the instructions further comprise additional instructions for directing the processing unit to determine if the request relates to an addition of a new file to the unified file system and if the request relates to the addition of the new file to the unified file system, to obtain from the unification policy a branch the file is to be added to. The instructions further direct the processing unit to determine if the addition of the new file satisfies a unification policy and a branch policy of the branch the file is to be added to, and if the addition of the new file satisfies the unification policy and the branch policy of the branch the file is to be added to, to add the file to the branch, to create a virtual file in the unified file system for the file added to the branch, and to apply the branch policy of the branch and the unification policy to the virtual file.

In accordance with embodiments of the application, the instructions further comprise additional instructions for directing the processing unit to determine if the request relates to deleting an existing file in the unified file system and if the request relates to deletion of an existing file in the unified file system, to direct the processing unit to determine if the request to delete an existing file satisfies the corresponding unification policy and branch policy associated with the existing file. The instructions then update the metadata to delete the link relationship between the deleted virtual file and branch file.

BRIEF DESCRIPTION OF THE DRAWINGS

The above advantages and features in accordance with this application are described in the following detailed description and are shown in the following drawings.

DETAILED DESCRIPTION

This application relates to a system and method for operating a policy aware unified file system within a computer system. More particularly, this application relates to a system and method for operating a unified file system that takes into account a unification policy of the unified file system and also the security requirements of each branch within the computer system as each branch is unified into the unified file system. The application also takes into account the security requirements of each branch and the unification policy of the unified file system when the unified file system is accessed by an application. Further, as the application is compatible with existing branch policies of files and directories of each branch that is to be unified, the application supports the enforcement of modular security policies or modular requirements of each file and/or directory that has been unified into the unified file system.

Figure 1:
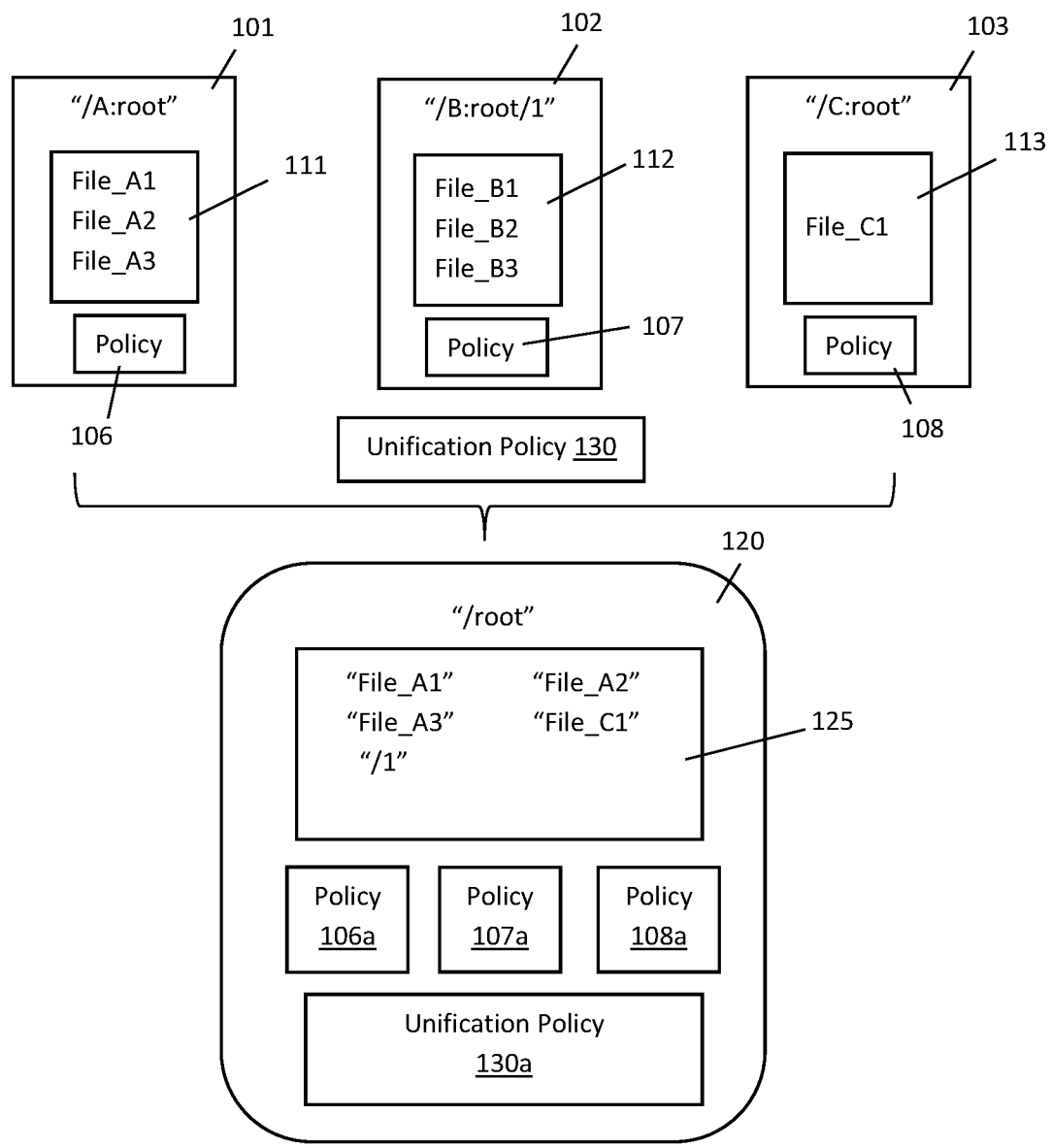
FIG. 1 illustrating an exemplary unified file system accessible to obtain a listing of files of three separate file systems that have been unified in accordance with an embodiment of the application.

FIG. 1 illustrates an example of a group of separate file systems whereby each file system may be identified as a branch and this group includes branch 101, branch 102 and branch 103. These branches may be located within a computer system in accordance with an embodiment of the application. As illustrated in FIG. 1, the directory named "/A:root" within branch 101 contains files 111, the directory named "/B:root/1" within branch 102 contains files 112 and the directory named "/C:root" within branch 103 contains files 113. Further, each branch would contain its own branch policy which sets out the runtime restrictions of the files contained with the branch/file system and the unification restrictions for its own branch. For example, the branch policy may specify which files within the file system/branch are read-only, read-write only, executable, non-executable, etc. One skilled in the art will recognize that other types of access control or permission control may be included in the branch policy without departing from this application. The branch policy for branch 101 is contained within policy 106, the branch policy for branch 102 is contained within policy 107 and the branch policy for branch 103 is contained within policy 108. Branch policies 106, 107, 108 may each comprise a database metadata file in their respective file systems. In the database metadata file, conceptually, each row in the database may indicate the file path in the file system and its corresponding runtime policy. For example, assuming that File_A1 in branch 101 is a read-only file, this may be represented in a row in policy 106 as ("/A:root/File-A1, read-only"). A compressed representation may also be used, for example, using regular expressions will allow multiple rows to be written as a single row in the policy.

Unification policy 130 may also be provided within the computer system and may be retrieved by the computer system as required. Unification policy 130 may be used to specify the type of files and/or directories that may be included or excluded from the unified file system in one particular unification process as well as the locations where new files may be added. In addition to the above, unification policy 130 may also specify runtime access control policies of the files contained with the unified file system. For example, unification policy 130 may be used to filter out files of a particular type, size, or having a particular name, owner, permission or attributes during the unification process or when the unified file system is accessed. One skilled in the art will recognize that other types of file attributes may be utilized as the filtration criteria of unification policy 130 without departing from this application.

Unification policy 130 may comprise a database metadata file that is located at a different physical location within the computer system from the location of branches 101, 102, 103. Each row within this metadata file may indicate a unification policy that is applied on particular file system/branch. For example, assuming that unification policy 130 includes the policy that any ".txt" file in branch 101 is to be excluded from the unified file system. This policy will then be represented as a row within unification policy 130 ("file system 101, *.txt is excluded").

The creation of unified file system 120 may be initiated by the computer system. It should be noted that unified file system 120 will be created at a different physical location within the computer system from the location of the file systems or branches within the computer system. In accordance with embodiments of the application, the computer system may use a specific command such as a system call to create a directory "/root", e.g., "mkdir" system call, in this different physical location as the root directory for unified file system 120.

Once the computer system receives a request to create unified file system 120 based on branches 101, 102 and 103, the computer system will retrieve unification policy 130 and branch policies 106-108 that are each associated with branches 101, 102 and 103 respectively. In accordance with embodiments of the application, in order to embed the policies of the unified branches and the unification policy within unified file system 120, the computer system may create virtual branch policy files 106*a*, 107*a*, 108*a* and virtual unification policy 130*a* in the unified file system 120 whereby each of these virtual branch policy files link back to branch policy files 106, 107, 108 and unification policy 130 respectively. In doing so, unified file system 120 may utilize these virtual policies to read from the actual corresponding database files that contain details about branch policies 106-108 and unification policy 130 as required.

Files and directories from each branch may be added to unified file system 120 using a variety of methods. In accordance with an embodiment of the application, virtual files for all the files and directories in a selected branch are initially created within the unified file system. The branch policy of the selected branch and the unification policy of unified file system are then applied to these newly created virtual files. These policies include, but are not limited to, policies that determine the permissions that are to be applied to each newly created virtual file, policies that determine which virtual files are to be omitted from the unified file system and policies that determine the accessibility of these virtual files. This process is then repeated for all the other branches until all the branches have been successfully unified into the unified file system.

This embodiment is illustrated by an example that makes reference to FIG. 1. When branch 101 is selected, virtual files that correspond to the files within the directory named "/A:root", i.e. File_A1, File_A2, File_A3, will be created within unified file system 120. It should be noted that the corresponding virtual files in unified file system 120 reference the actual files contained within branch 101 and are not copies of data files File_A1, File_A2, File_A3. It should also be noted that the corresponding virtual files within unified file system 120 will also have the same file name as that of their respective files, i.e. File_A1, File_A2, File_A3 however these files will now have a different pathname. This means that virtual files within unified file system 120 that correspond to files from branch 101 will have the following pathnames instead: "/root/File_A1", "/root/File_A2", "/root/File_A3".

In accordance with embodiments of the application, virtual files within unified file system 120 may be implemented as dummy files or symbolic links which provide a reference or a link to the actual data file to which the virtual file corresponds to. Further, when a virtual file is implemented using a symbolic link, the unified file system's driver adds additional runtime restrictions on the access of the symbolic links to disable direct link modification by applications. Additionally, the unified file system's driver can also be customized to represent the virtual files as regular files for applications even though internally they are symbolic links, therefore applications need not be aware that the files in the unified file system are symbolic links. An alternative approach is through the use of a dummy file. A dummy file is a special file that is used to indicate the link relationship with another file and can even be an empty file. In accordance with embodiments of the application, in a UNIX system, the virtual files within unified file system 120 may be implemented as index nodes that contain a link to the actual location of the data file. These index nodes may then be utilized by an application or the computer system to access the data file that the index node corresponds to.

Further, in order to ensure that the link relationship between the virtual files and the actual data files in their respective branches are not corrupted, certain operations such as a creation/relink operation is by default disabled by the unified file system's driver. The unified file system's driver only allows requests by the computer system for the creation/relink operation of the symbolic links in the unified file system if the purpose is for the maintaining of a consistent link relationship. For example, when files having the same name, but are located in separate branches are unified; the computer system provides interfaces for privileged applications to switch the linkages of these virtual files in the unified file system.

Once the corresponding virtual files of File_A1, File_A2, File_A3 have been created within unified file system 120, branch policy 106 and unification policy 130 will be applied to these virtual files. In accordance with an embodiment of the application, branch policy 106 and 130 will be used to determine which file is to be excluded from the unified file system and the permission or access limitations of these virtual files in the unified file system will then be set using branch policy 106 and unification policy 130. For example, unification policy 130 may state that only ".txt" file formats may be added to unified file system 120. As such, if File_A1 is of a ".txt" file format, a corresponding virtual file of File_A1 will be allowed to remain within unified file system 120. If File_A1 does not satisfy the conditions of unification policy 130, the virtual file of File_A1 will then be omitted from unified file system 120.

This process then repeats itself until all the files and directories contained within branches 102 and 103 have undergone the unification process and have been unified into unified file system 120. In other words, virtual files that correspond to the files within the directory named "/B:root", i.e., 1/, and "/C:root", i.e., File_C1, will be created within unified file system 120 under the directory "/root". Once the corresponding virtual files of these files have been created within unified file system 120, branch policy 107 will be applied to virtual files originating from branch 102, branch policy 108 will be applied to virtual files originating from branch 103 and unification policy 130 will be applied to all these virtual files. The resulting virtual files are then displayed in directory 125 in unified file system 120.

In accordance with another embodiment of the application, the computer system traverses each branch that is to be unified and only creates a corresponding virtual file for a selected file from a branch if the selected file satisfies the relevant branch policy and the unification policy.

This embodiment is best illustrated by an example that makes reference to FIG. 1. When branch 101 is selected, branch policy 106 and unification policy 130 is first retrieved by the computer system. The computer system then selects a file from branch 101, which is File_A1. Branch policy 106 and unification policy 130 are then applied to File_A1. If the properties of File_A1 satisfy the conditions in these policies, a corresponding virtual file, File_A1, will be created within unified file system 120. Conversely, if the properties of File_A1 do not satisfy the conditions of these policies, a corresponding virtual file will not be created in unified file system 120 and this file will be omitted. The computer system then proceeds to select the next file in branch 101, which in this example would be File_A2. Similarly, branch policy 106 and unification policy 130 are applied to this file as well and if the conditions of these policies are met, a corresponding virtual file of File_A2 will be created in unified file system 120. This process then repeats itself until the computer system has completely traversed through all the directories within branch 101. The computer system then selects the next branch that is to be unified and proceeds to repeat the traversing process described above until all the branches that are to be added have been processed accordingly.

Once this is done, an application may query unified file system 120 to obtain a listing of files and sub-directories within directory 125 of unified file system 120. In other words, all the files from the various branches in the computer system that have been successfully unified into unified file system 120 may be viewed as a single listing by the software application. In the example provided in FIG. 1, branches 101, 102, and 103 have been unified into unified file system 120. This means that files 111, 112 and 113 would also have been added to unified file system 120. Contents of directories within unified file system 120 may then be seen together in a single merged directory. An example of such a single merged directory would be directory 125 which shows that the merged view of directory "/root" contains files File_A1, File_A2, File_A3, File_C1 and directory "1/". It should also be noted that as the branch policies of branches 101-103 were applied to each of these virtual files, this means that the original access control or permissions of each of these files have been imported as well when the respective corresponding virtual files were added to unified file system 120.

When a software application makes a request to access unified file system 120, the computer system will first determine whether the request satisfies unification policy 130*a* of unified file system 120. If the request satisfies the conditions within unification policy 130*a*, the computer system will then allow the application to access unified file system 120. The computer system then proceeds to determine the nature of the request. If the request relates to the access of an existing file in unified file system 120, the computer system will check if the request satisfies a branch policy associated with the file that is to be accessed. In accordance with embodiments of the application, the request to access an existing file within a branch of the computer system may include, but is not limited to, a modification request, e.g. a request to edit, delete, rename, or a verification request to verify the existence of the file, etc. If it is determined that the request meets the branch policy of the corresponding virtual file and the unification policy, the computer system will then use the linking information contained within the virtual file to redirect the application to the actual location of the data file that is to be accessed. After the application is done with the file, the computer system will then update the corresponding virtual file in unified file system 120 accordingly.

For example, if an application wishes to access File_C1 in the unified file system, the request will first be assessed by unification policy 130*a*. If the access request satisfies the conditions within unification policy 130*a*, branch policy 108*a* will then be utilized by the computer system to determine whether File_C1 may be accessed by the application. In this example, it is assumed that the access request comprises a request to modify the data within File_C1 and in this example; branch policy 108*a* states that File_C1 is a "read-write only" type of data file. As such, modifications may be made to the content of File_C1 as this request satisfies the permission policy in branch policy 108*a*. Unified file system 120 will then utilize the corresponding virtual file of File_C1 to redirect the application's modification request to the actual location of data file File_C1 within branch 103. After the necessary modifications have been made to File_C1, the changes made to File_C1 will be recorded within the metadata of the corresponding virtual file within unified file system 120. For example, if File_C1 is renamed to File_C2, the corresponding virtual file File_C1 in the unified file system should also be renamed to File_C2, and the metadata of the corresponding virtual file should also be updated accordingly step by step by the computer system.

Alternatively, if an application wishes to add a new file to the unified file system, similar checks will be carried out using unification policy 130*a* and the appropriate branch policy. This means that if the checks yield a positive outcome, unification policy 130*a* will be utilized to determine which branch this new file is to be added to. In accordance with embodiments of the application, information about the branch and directory to which the new file is to be added to may be contained within unification policy 130*a* or may be contained within the addition request from the software application.

For example, when the application tries to add a data file to unified file system 120, the request will first be assessed by unification policy 130*a*. If the access request satisfies the conditions within unification policy 130*a*, the computer system then determines the nature of the request. As this request relates to the addition of a new file to unified file system 120, unification policy 130*a* will then be utilized to assist the computer system in determining whether a virtual file may be created within unified file system 120 for this new file. If the new file that is be added does not satisfy the conditions of unification policy 130*a*, a corresponding virtual file will not be created within unified file system 120. In the event the new file to be added satisfies the conditions of unification policy 130*a*, the computer system will utilize unification policy 130*a* to determine the branch to which the new file is to be added to. In this example, it is assumed that unification policy 130*a* determines that the file is to be added to branch 101. As the new file is to be added to branch 101, branch policy 106*a* is then utilized to determine whether the file may be added to branch 101. If the new file satisfies branch policy 106*a*, the new data file may then be created at a physical location within branch 101. It should also be noted that in other embodiments of the application, the location in which the new data file is to be created may instead be stipulated in the access request instead of in unification policy 130*a*.

The computer system will then create a corresponding virtual file in unified file system 120 for the newly added data file. The branch policy associated with the newly created data file is also applied to the corresponding virtual file within unified file system 120 so that the security level of the corresponding virtual file is maintained in the unified view of unified file system 120. The metadata of unified file system 120 will then be updated accordingly.

Conversely, if the application tries to remove or delete a data file from the unified file system, this deletion request will be directed to the corresponding branch by the computer system. Unification policy 130*a* and the corresponding branch policy will then be utilized by the computer system to determine whether the data file may be deleted from the corresponding branch. In the event the data file may be deleted, the corresponding virtual file in unified file system 120 will be deleted and the actual data file in the corresponding branch will be deleted too.

In accordance with embodiments of the application, unified file system 120 may be optimized to create virtual files in an on-demand fashion only when they are accessed by a software application. Such an optimization process is identified as a lazy creation of virtual files. When the software application tries to access a file in unified file system 120, if the file doesn't exist in unified file system 120, the computer system checks whether the file that is to be accessed by the software application exists in branch file systems 101, 102, 103. If the computer system finds the file in anyone of these branch systems, and if the file satisfies branch and unification policies, it then creates the virtual file in unified file system 120 according to this demand. The relevant branch policy and unification policy is then applied to this virtual file.

Figure 2:
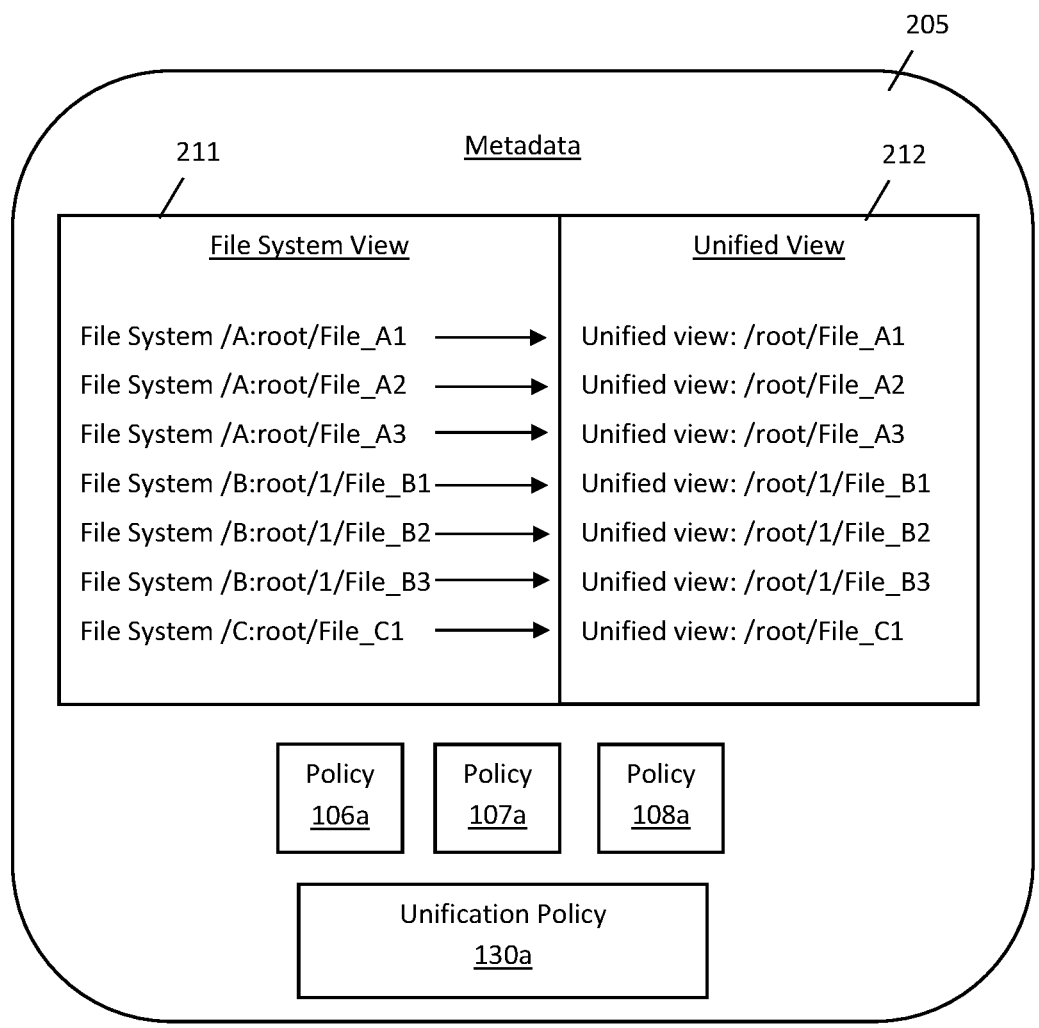
FIG. 2 illustrating metadata of the unified file system shown in FIG. 1 in accordance with embodiments of the application.

Each time a corresponding virtual file is created, altered or updated within unified file system 120 in accordance with embodiments of the application, a link relationship between the corresponding virtual file and the actual data file located in the original branch is stored or updated within a metadata of the unified file system. FIG. 2 illustrates an example of metadata that has been created for the virtual files contained within unified file system 120. Metadata 205 includes File System View 211 that contains detailed information about the pathnames and locations of the data files of various separate file systems and also includes Unified View 212 that contains detailed information about the pathnames of the corresponding virtual files within unified file system 120. When information from File System View 211 and Unified View 212 are combined together, this allows a computer system user or a software application to obtain the link relationship between an actual data file and its corresponding virtual file. Further, the virtual branch policies associated with each file system or branch and the virtual unification policy associated with unified file system 120 is also contained within metadata 205, i.e. policy 106a, policy 107a, policy 108a and unification policy 130a, and these policies may be retrieved and updated as required in accordance with embodiments of the application.

As metadata 205 contains sensitive information about unified file system 120, metadata 205 can only be accessed by a small number of software applications or users that have been accorded the necessary security clearances. In operation, metadata 205 may be stored in any type of secure storage medium, such as but not limited to, a standalone file in the storage medium, or in a separate storage partition within the storage medium.

In embodiments of the application, a software application with the appropriate security clearances may actually query the link relationships of virtual files in unified file system 120. The computer system upon receiving this query request may then utilize data contained within metadata 205 of unified file system 120 to obtain the link relationships between the files in branches 101, 102, 103 and their corresponding virtual files in unified file system 120. The computer system will then provide the link relationships to the software application for further processing.

Figure 3:
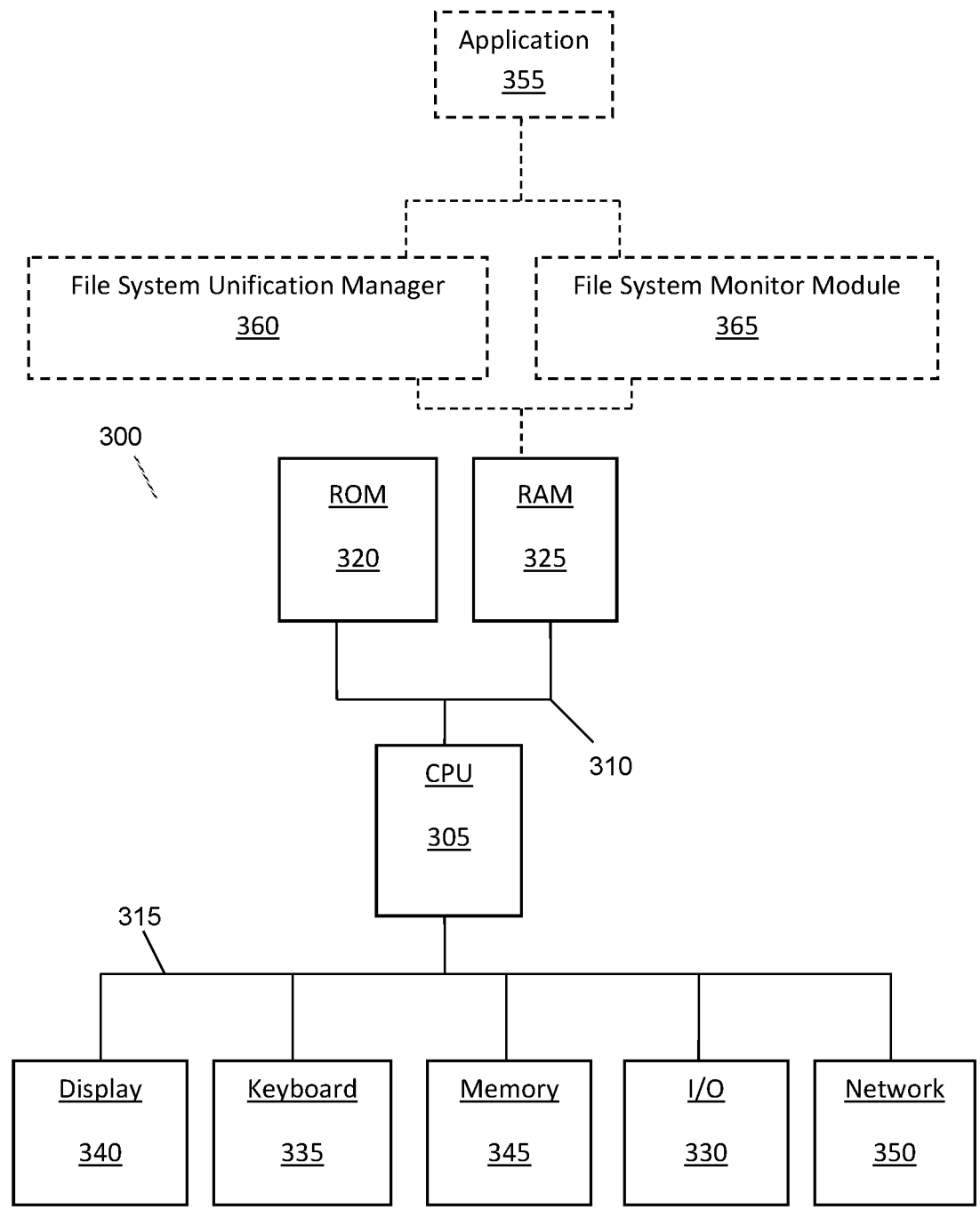
FIG. 3 illustrating a block diagram of a computer system for implementing the various embodiments of the application.

The various embodiments described above may be executed by instructions stored in a non-transitory medium and these instructions may be executed by a processing unit in a computer system. For the avoidance of doubt, non-transitory computer-readable medium shall be taken to comprise all computer-readable medium except for a transitory, propagating signal. A computer system may be provided in one or more computing devices and/or computer servers to provide this application. Further, it should be noted that the instructions may be stored as firmware, hardware, or software. FIG. 3 illustrates an example of such a processing system. Processing system 300 may be the processing system in the computer system and/or computer servers that execute the instructions to perform the processes for providing a method and/or system in accordance with embodiments of this application. One skilled in the art will recognize that the exact configuration of each processing system may be different and the exact configuration of the processing system in each computer system or computer server may vary and FIG. 3 is given by way of example only.

Processing system 300 includes Central Processing Unit (CPU) 305. CPU 305 is a processor, microprocessor, or any combination of processors and microprocessors that execute instructions to perform the processes in accordance with the present application. CPU 305 connects to memory bus 310 and Input/Output (I/O) bus 315. Memory bus 310 connects CPU 305 to memories 320 and 325 to transmit data and instructions between memories 320, 325 and CPU 305. I/O bus 315 connects CPU 305 to peripheral devices to transmit data between CPU 305 and the peripheral devices. One skilled in the art will recognize that I/O bus 315 and memory bus 310 may be combined into one bus or subdivided into many other busses and the exact configuration is left to those skilled in the art.

A non-volatile memory 320, such as a Read Only Memory (ROM), is connected to memory bus 310. Non-volatile memory 320 stores instructions and data needed to operate various sub-systems of processing system 600 and to boot the system at start-up. One skilled in the art will recognize that any number of types of memory may be used to perform this function.

A volatile memory 325, such as Random Access Memory (RAM), dynamic RAM (DRAM) or synchronous DRAM (SDRAM) is also connected to memory bus 310. Volatile memory 325 stores the instructions and data needed by CPU 305 to perform software instructions for processes such as the processes required for providing a system in accordance with embodiments of this application. One skilled in the art will recognize that any number of types of memory may be used as volatile memory and the exact type used is left as a design choice to those skilled in the art.

In particular, memory 325 may store computing modules or software such as file system unification manager 360 and file system monitor module 365. File system unification manager 360 may contain instructions that when executed by CPU 305, performs functions such as: the unification of separate file systems into a single unified file system, and the generation and updating of the metadata of the unified file system. File system monitor module 365 may contain instructions that when executed by CPU 305, performs functions such as: the monitoring of access requests to file systems and the interception of modification and/or addition requests from software applications, the intercepting of system calls to the unified file system, the redirecting of file system access requests to the physical location of the file systems by redirecting the path, the enforcing of branch policies specified for all the file systems and the enforcing of the unification policies. Memory 325 may also store software application 355 which contains instructions that when executed by CPU 305 performs various directory and file operations. Software application 355 may not be aware of the operation of the unified file system as implemented by file system unification manager 360 and file system monitor module 365. In other words, software application 355 will utilize the reference returned to it by file system unification manager 360 and file system monitor module 365 to carry out the directory and file operations as required.

I/O device 330, keyboard 335, display 340, memory 345, network device 350 and any number of other peripheral devices connect to I/O bus 315 to exchange data with CPU 305 for use in applications being executed by CPU 305. I/O device 330 is any device that transmits and/or receives data from CPU 305. Keyboard 335 is a specific type of I/O that receives user input and transmits the input to CPU 305. Display 340 receives display data from CPU 305 and display images on a screen for a user to see. Memory 345 is a device that transmits and receives data to and from CPU 305 for storing data to a medium. Network device 350 connects CPU 305 to a network for transmission of data to and from other processing systems.

Figure 4:
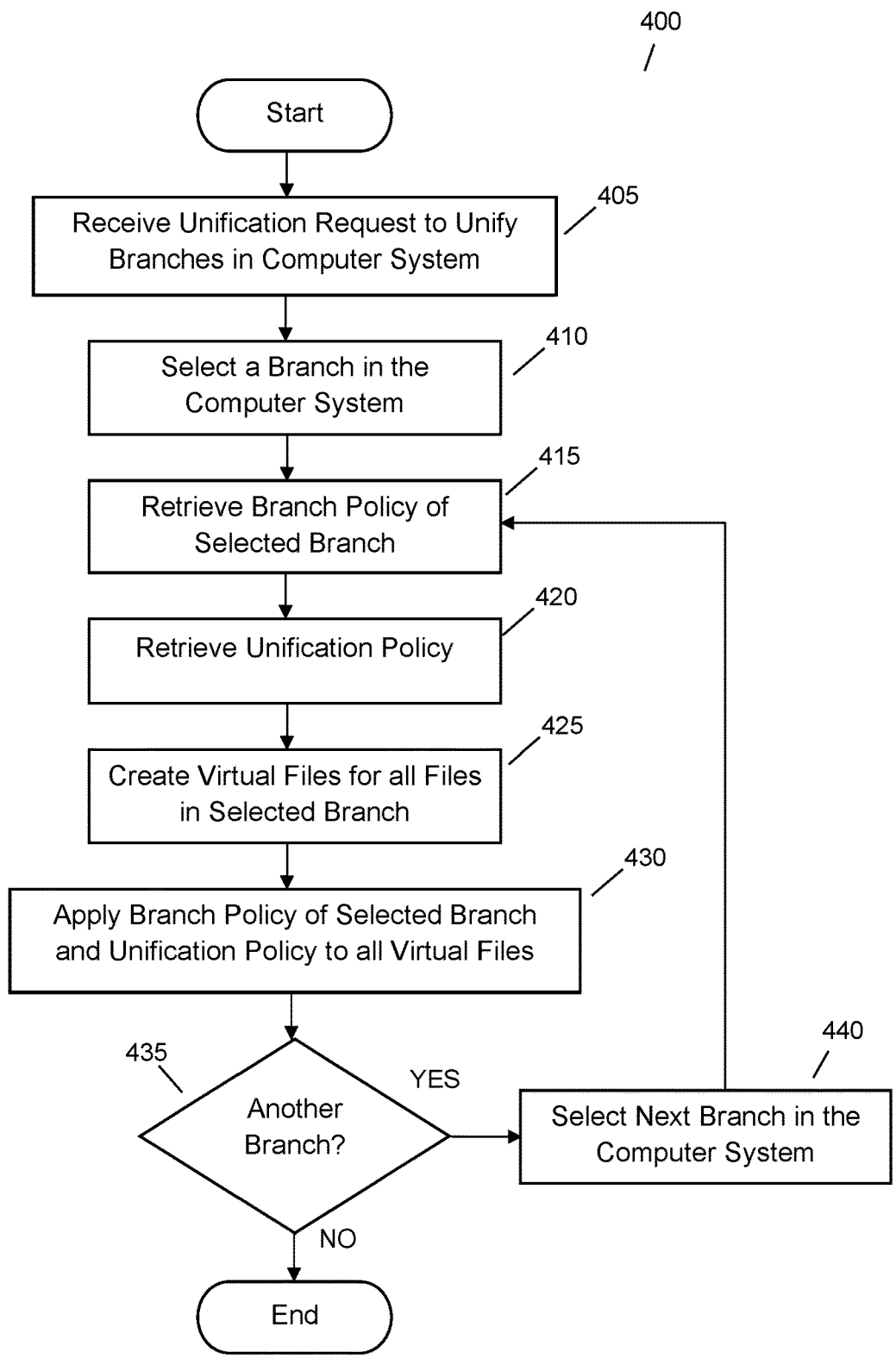
FIG. 4 illustrating a flow diagram of a process for creating a unified file system in accordance with embodiments of the application.

FIG. 4 illustrates process 400 that may be performed by file system unification manager 360 to create a unified file system in accordance with embodiments of this application. Process 400 begins at step 405 whereby process 400 receives a unification request to unify individual file systems or branches found within a computer system into a single unified file system. Process 400 begins the unification process by selecting a branch from the computer system at step 410. The branch policy of the selected branch is then retrieved by process 400 at step 415. Process 400 then proceeds to retrieve the unification policy of the unified file system at step 420. Virtual files are then created by process 400 in the unified file system for all the data files that are contained within the selected branch. This takes place at step 425. The retrieved branch policy for the selected branch and the unification policy are then applied to the virtual files at step 430. At this step, any virtual file that does not comply with the branch policy or unification policy is deleted and subsequently omitted from the unified file system. Process 400 then determines at step 435 whether there is another branch or file system in the computer system that is to be unified. If there is another branch that is to be unified, process 400 proceeds to step 440. At step 440, the next branch of the computer system that is to be unified into the unified file system is then selected. Process 400 then proceeds to step 415 whereby the branch policy of the selected branch is retrieved. Process 400 repeats steps 440 to 435 until all the branches in the computer system have been unified. Process 400 then ends.

Figure 5:
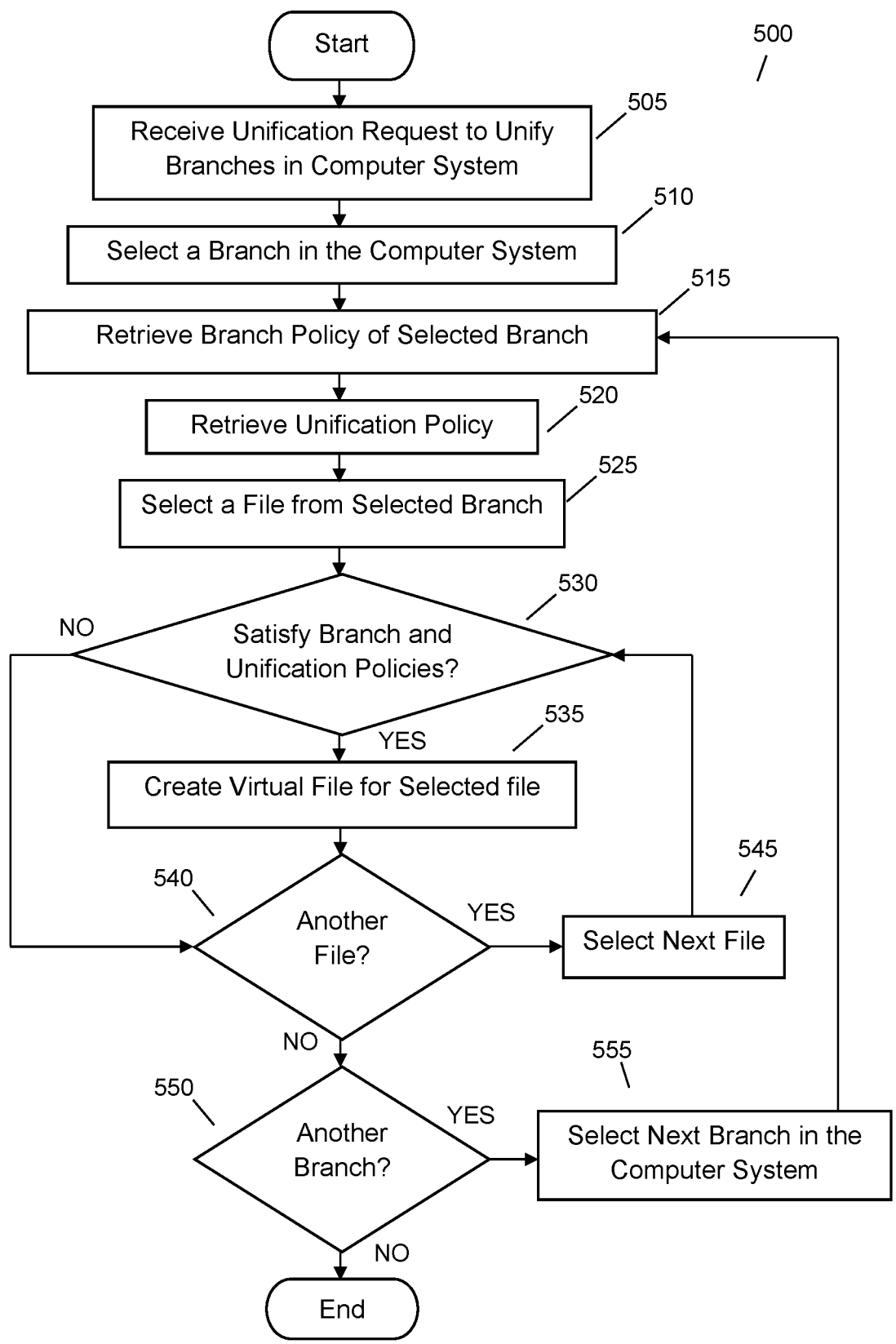
FIG. 5 illustrating a flow diagram of another process for creating a unified file system in accordance with embodiments of the application.

FIG. 5 illustrates process 500 that may be performed by file system unification manager 360 to create a policy aware unified file system in accordance with embodiments of this application. Process 500 begins at step 505 whereby process 500 receives a unification request to unify individual file systems or branches found within a computer system into a single unified file system. Process 500 begins the unification process by selecting a branch from the computer system at step 510. The branch policy of the selected branch is then retrieved by process 500 at step 515. Process 500 then proceeds to retrieve the unification policy of the unified file system at step 520. A file from the selected branch is then selected by process 500 at step 525. Process 500 then determines at step 530 whether the selected file from the selected branch satisfies the conditions in the branch policy and the unification policy. If the selected file satisfies all the conditions in the branch policy and the unification policy, process 500 then proceeds to step 535. At this step, a virtual file is created in the unified file system for the selected file. This virtual file will be accorded with the permissions and access level controls specified in both the branch policy and the unification policy. Process 500 then proceeds to step 540. At step 540, process 500 determines whether the selected branch contains another file that has yet to be selected by process 500. If process 500 determines that there is another file that has not yet been selected, process 500 proceeds to step 545. At step 545, process 500 selects the next file and repeats steps 530 to 545 until all the files have been selected by process 500. Returning to step 540, after process 500 determines that all the files in the selected branch have been processed by process 500, process 500 then proceeds to step 550. Process 500 determines at step 550 whether the computer system contains another branch that has not yet been added to the unified file system. If process 500 determines that there is another branch that has yet to be added to the unified file system, process 500 then proceeds to step 555. At step 555, process 500 selects the next branch in the computer system that is to be added to the unified file system. Process 500 then proceeds to step 515. Steps 550 to 515 repeats until all the branches in the computer system have been added to the unified file system. Process 500 then ends.

Figure 6:
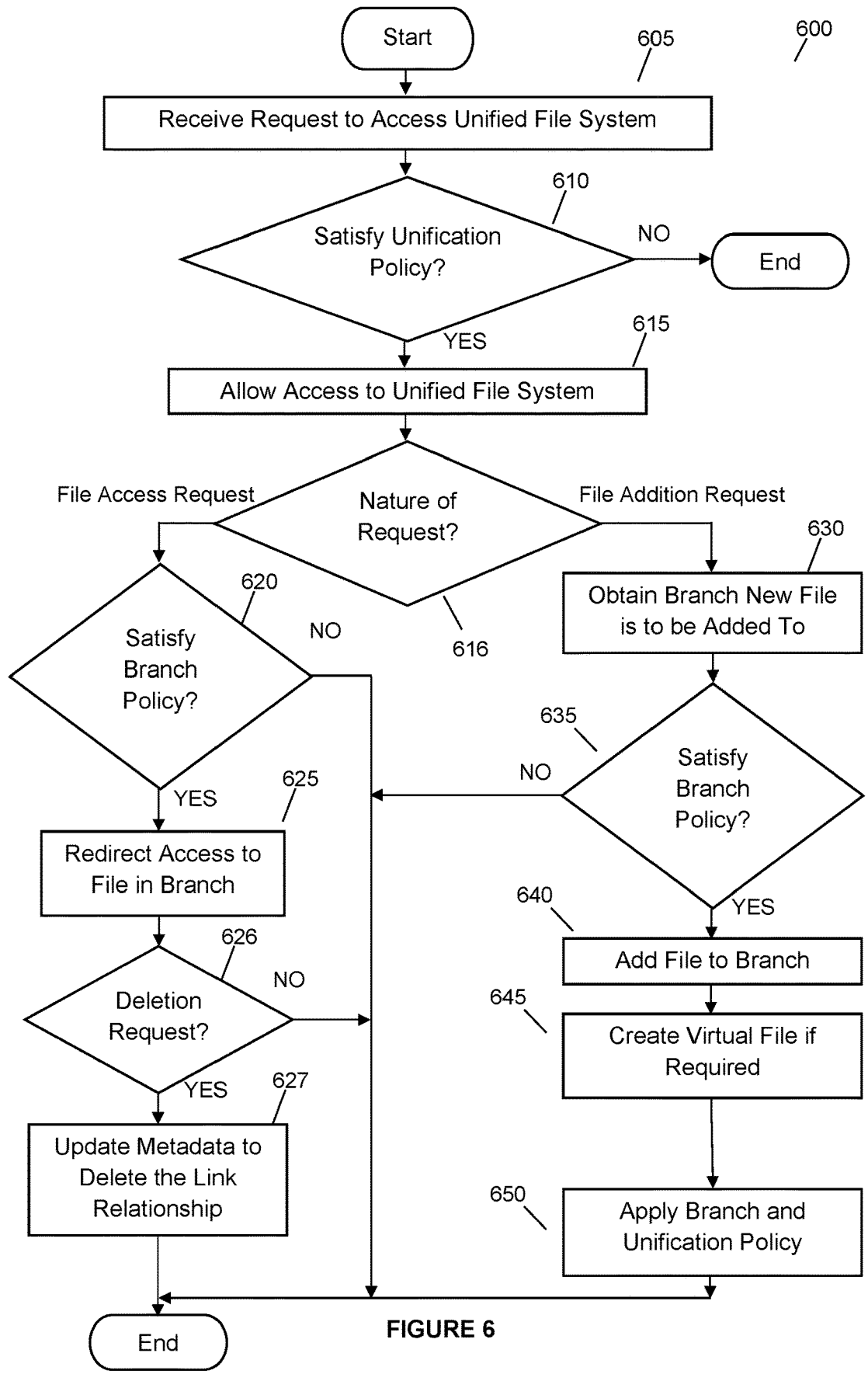
FIG. 6 illustrating a flow diagram of a process for operating a unified file system in accordance with embodiments of the application.

FIG. 6 illustrates process 600 that may be performed by file system monitor module 365 to operate the policy aware unified file system that has been previously created in accordance with embodiments of this application. Process 600 begins at step 605 whereby process 600 receives a request from an application to access the unified file system. At step 610, process 600 then determines whether the request satisfies conditions contained within the unified file system's unification policy. If the conditions are not met, process 600 ends. Alternatively, if the access request satisfies the conditions in the unification policy, process 600 proceeds to step 615. At step 615, process 600 allows the applications to access the unified file system. The nature of the access request is assessed by process 600 at step 616. If process 600 determines that the request relates to an existing file in the unified file system, process 600 proceeds to step 620. At step 620, process 600 determines whether the request satisfies a branch policy associated with the file that is to be accessed. If the request does not satisfy the branch policy, process 600 then ends. Alternatively, if the request does comply with the branch policy, process 600 then proceeds to step 625 whereby process 600 utilizes metadata of the unified file system to redirect the access request to the actual data file located in the file system or branch of the computer system. At step 626 if process 600 determines that the access request relates to a deletion request, process 600 proceeds to step 627. At 627, process 600 updates the metadata to delete the link relationship between the data file to be deleted and the corresponding virtual file in the unified file system. Process 600 then ends. Alternatively, at step 626, if process 600 determines that the access request does not relate to a deletion request, process 600 then ends.

Returning to step 616, if process 600 determines that the request relates to an addition request to add a new file to the unified file system process 600 then proceeds to step 630 instead. At step 630, process 600 determines to which branch the new file is to be added. This information may be provided by the unification policy or may be contained within the addition request. Process 600 then proceeds to step 635 whereby process 600 will determine whether the addition request satisfies the branch policy of the branch that the new file is to be added to. If process 600 determines that both the branch policy is not complied with, process 600 then ends. Alternatively, if process 600 determines that the branch policy is satisfied, process 600 then proceeds to step 640. At step 640, the new file is added to the appropriate branch by process 600. Process 600 then creates a virtual file in the unified file system for the newly added file at step 645. After the virtual file is created, process 600 proceeds to step 650 where the relevant branch policy and unification policy is applied to the virtual file. This is so that the virtual file will be accorded with the permissions and access controls specified in both the branch policy and the unification policy. Process 600 then ends.

Figure 7:
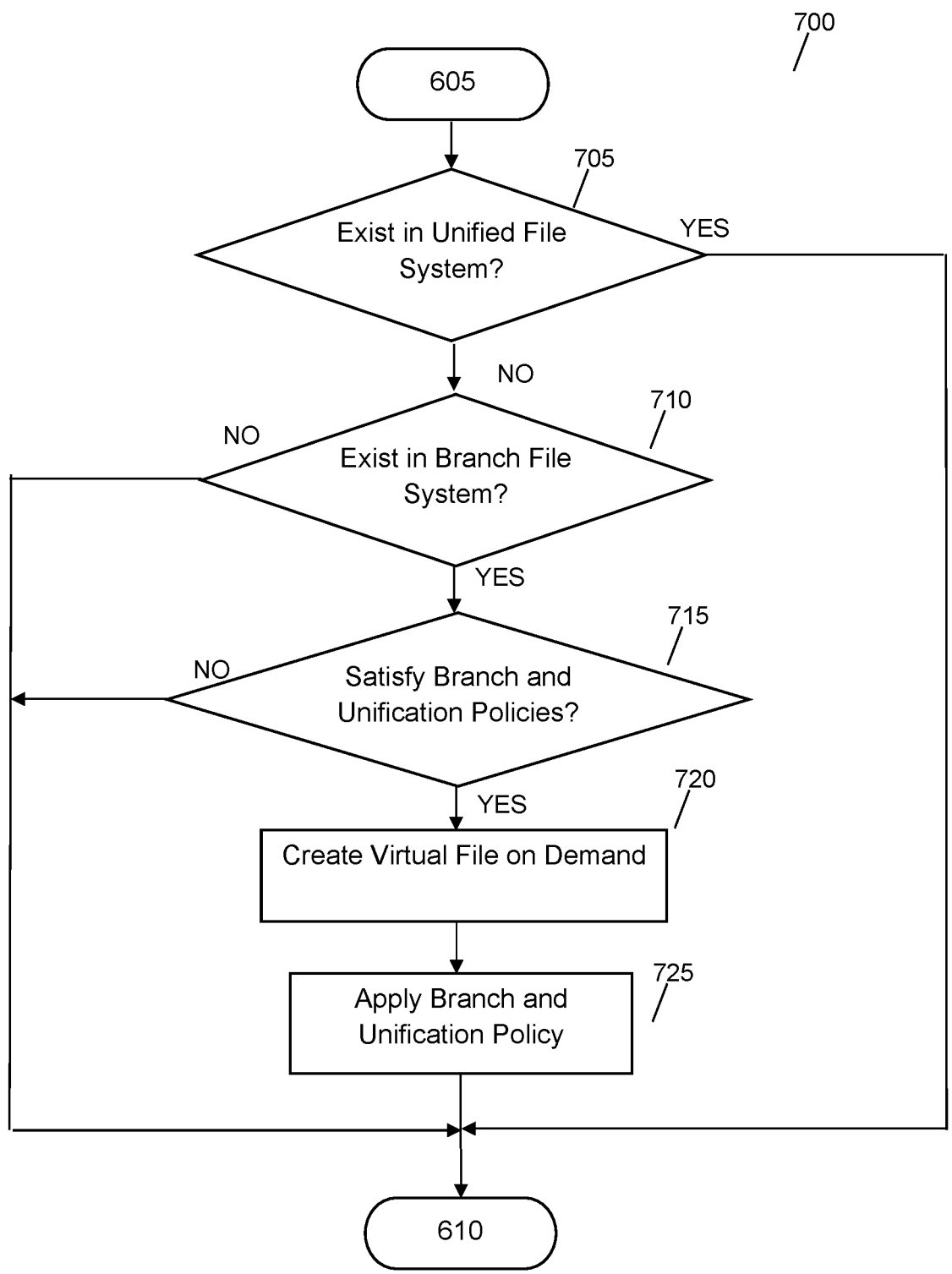
FIG. 7 illustrating a flow diagram of a process for the lazy creation of virtual files in the unified file system in accordance with embodiments of the application.

FIG. 7 illustrates process 700 that may be performed by file system monitor module 365 to optimize the process between step 605 and step 610 of process 600 in FIG. 6. To recap, at step 605, process 600 receives a request from an application to access the unified file system. Process 700 takes this request received at step 605 and then proceeds to step 705. Process 705 determines at step 705 whether a file referred to in the request exists in the unified file system. If the file referred to in the request exists, process 700 proceeds to step 610 and process 700 ends. Alternatively, if process 700 determines at step 705 that the file referred to in the request does not exist in the unified file system, process 700 proceeds to step 710. At step 710, process 700 determines whether the file referred to in the request exists in the branch file systems.

If the file referred to in the request does not exist in the branch file systems, process 700 proceeds to step 610 and ends. Alternatively, if the file referred to in the request exists in the branch file systems, process 700 proceeds from step 710 to step 715. At step 715, process 700 determines whether the file referred to in the request satisfies the relevant branch and unification policies. If these policies are not complied with, process 700 proceeds to step 610 and end. If these policies are complied with, process 700 proceeds to step 720 whereby a corresponding virtual file is created within the unified file system. Process 700 then applies the relevant branch policy and the unification policy to the newly created virtual file at step 725. Process 700 then proceeds to step 610 and ends.

The above is a description of embodiments of a system and process in accordance with the present application as set forth in the following claims. It is envisioned that others may and will design alternatives that fall within the scope of the following claims.

What is claimed is:

1. A method of operating a policy aware unified file system of a computer system, the method comprising:
   unifying existing branches which are located in a group of separate file systems in the computer system to create the policy aware unified file system, wherein the policy aware unified file system includes virtual branch policies of the unified existing branches and a unification policy of the policy aware unified file system, and wherein each file system in the group of separate file systems is considered a branch, and wherein the unification policy comprises a file that is located at a different physical location within the computer system from the location of the unified existing branches, and wherein the policy aware unified file system is created at a different physical location within the computer system from the location of the unified existing branches;
   wherein each branch policy of each unified existing branch is located at its respective branch;
   wherein the virtual branch policies of the unified existing branches are located at the different physical location;
   receiving a request from an application to access the policy aware unified file system;
   determining whether the request satisfies the unification policy and a corresponding branch policy; and
   in response to the request satisfying the unification policy and the corresponding branch policy, allowing the application to access the policy aware unified file system.

2. The method according to claim 1, wherein the unifying the existing branches in the computer system to create the policy aware unified file system comprises:

a) selecting a branch from the existing branches in the computer system;
   b) retrieving a branch policy associated with the selected branch and retrieving the unification policy associated with the policy aware unified file system;
   c) creating virtual files in the policy aware unified file system for all files in the selected branch, wherein each created virtual file corresponds to a file in the selected branch;
   d) applying the retrieved branch policy associated with the selected branch and the retrieved unification policy to all the virtual files created for the files in the selected branch; and
   e) repeating processes (a) to (d) until all branches in the computer system have been selected.

3. The method according to claim 2, wherein the creating the virtual file in the policy aware unified file system for the selected file further comprises:
   creating a symbolic link or a dummy file to the selected file;
   adding the symbolic link or the dummy file to the policy aware unified file system; and
   updating a metadata of the policy aware unified file system, wherein a link relationship between the symbolic link or the dummy file with the selected file is recorded in the metadata.

4. The method according to claim 1, wherein the unifying the existing branches in the computer system to create the policy aware unified file system comprises:
   a) selecting a branch from the existing branches in the computer system;
   b) retrieving a branch policy associated with the selected branch and retrieving unification policy associated with the policy aware unified file system;
   c) selecting a file from the branch;
   d) determining whether the selected file satisfies the retrieved branch policy associated with the selected branch and satisfies the retrieved unification policy;
   e) when the selected file satisfies the retrieved branch policy associated with the selected branch and the retrieved unification policy, creating a virtual file in the policy aware unified file system for the selected file;
   f) repeating processes (c) to (e) until all files in the selected branch have been selected;
   g) repeating processes (a) to (f) until all branches in the computer system have been selected.

5. The method according to claim 1, further comprising:
   receiving from the application, a query request to query link relationships of virtual files in the policy aware unified file system;
   using metadata of the policy aware unified file system to obtain the link relationships between files in a first file system and virtual files in the policy aware unified file system which correspond to the files in the first file system; and
   providing the link relationships to the application.

6. The method according to claim 1, further comprising:
   determining whether the request relates to an access of an existing file in the policy aware unified file system;
   when the request relates to the access of the existing file in the policy aware unified file system, determining whether the request to access the existing file satisfies the unification policy and a branch policy associated with the existing file to be accessed;
   when the request to access the existing file satisfies the unification policy and the branch policy of the existing file to be accessed, allowing the application to access the existing file within the policy aware unified file system;
determining whether the request to access the existing file is a deletion request; and
when the request to access the existing file is determined to be the deletion request, updating a metadata to delete a link relationship between the existing file and a corresponding virtual file.

7. The method according to claim 1, further comprising:
determining whether the request relates to an addition of a new file to the policy aware unified file system, which further comprises the following:
when the request relates to the addition of the new file to the policy aware unified file system:
obtaining from the unification policy, a branch that the file is to be added to;
determining whether the addition of the new file satisfies the unification policy and a branch policy of the branch that the file is to be added to; and
when the addition of the new file satisfies the unification policy and the branch policy of the branch that the file is to be added to:
adding the file to the branch;
creating a virtual file in the policy aware unified file system for the file added to the branch; and
applying the branch policy of the branch and the unification policy to the virtual file.

8. The method according to claim 1, further comprising: a lazy creation optimization process when a software application accesses a file in the policy aware unified file system, wherein the lazy creation optimization process includes:
determining whether the request relates to an access of an existing file in the policy aware unified file system;
when the request does not relate to the access of the existing file, determining whether the file exists in a branch file system;
when the file is determined to exist in the branch file system, determining whether unifying the file into the policy aware unified file system satisfies both the unification policy and the branch policy; and
when unifying the file into the policy aware unified file system satisfies both the unification policy and the branch policy, creating a virtual file in the policy aware unified file system for the file.

9. A system for operating a policy aware unified file system of a computer system, the system comprising:
a processing unit; and
a non-transitory medium readable by the processing unit, the medium storing instructions that when executed by the processing unit cause the processing unit to:
unify existing branches which are located in a group of separate file systems in the computer system to create the policy aware unified file system, wherein the policy aware unified file system includes virtual branch policies of the unified existing branches and a unification policy of the policy aware unified file system, and wherein each file system in the group of separate file systems is considered a branch, and wherein the unification policy comprises a file that is located at a different physical location within the computer system from the location of the unified existing branches, and wherein the policy aware unified file system is created at a different physical location within the computer system from the location of the unified existing branches;
wherein each branch policy of each unified existing branch is located at its respective branch;
wherein the virtual branch policies of the unified existing branches are located at the different physical location;
receive a request from an application to access the policy aware unified file system;
determine whether the request satisfies the unification policy and a corresponding branch policy;
in response to the request satisfying the unification policy and the corresponding branch policy, allowing the application to access the policy aware unified file system.

10. The system according to claim 9, wherein the instructions to unify the existing branches further cause the processing unit to:
a) select a branch from the existing branches in the computer system;
b) retrieve a branch policy associated with the selected branch and retrieve the unification policy associated with the policy aware unified file system;
c) create virtual files in the policy aware unified file system for all files in the selected branch, wherein each created virtual file corresponds to a file in the selected branch;
d) apply the retrieved branch policy associated with the selected branch and the retrieved unification policy to all the virtual files created for the files in the selected branch; and
e) repeat processes (a) to (d) until all branches in the computer system have been selected.

11. The system according to claim 10, wherein the instructions to create the virtual file
further cause the processing unit to:
create a symbolic link or a dummy file to the selected file;
add the symbolic link or the dummy file to the policy aware unified file system; and
update a metadata of the policy aware unified file system, wherein a link relationship between the symbolic link or the dummy file with the selected file is recorded in the metadata.

12. The system according to claim 9, wherein the instructions to unify the existing branches further cause the processing unit to-select a branch from the existing branches in the computer system;
a) retrieve a branch policy associated with the selected branch and retrieve the unification policy associated with the policy aware unified file system;
b) select a file from the branch;
c) determine whether the selected file satisfies the retrieved branch policy associated with the selected branch and satisfies the retrieved unification policy;
d) when the selected file satisfies the retrieved branch policy associated with the selected branch and the retrieved unification policy, to create a virtual file in the policy aware unified file system for the selected file;
e) repeat processes (c) to (e) until all files in the selected branch have been selected;
f) repeat processes (a) to (f) until all branches in the computer system have been selected.

13. The system according to claim 9, wherein the instructions further cause the processing unit to:
receive from the application, a query request to query link relationships of virtual files in the policy aware unified file system;
use metadata of the policy aware unified file system to obtain the link relationships between files in a first file system and virtual files in the policy aware unified file system which correspond to the files in the first file system; and provide the link relationships to the application.

14. The system according to claim 9, wherein the instructions further cause the processing unit to:
 determine whether the request relates to an access of an existing file in the policy aware unified file system;
 when the request relates to the access of the existing file in the policy aware unified file system, determine whether the request to access the existing file satisfies the unification policy and a branch policy associated with the existing file to be accessed;
 when the request to access the existing file satisfies the unification policy and the branch policy of the existing file to be accessed, allow the application to access the existing file within the policy aware unified file system;
 determine whether the request to access the existing file is a deletion request; and
 when the request to access the existing file is determined to be the deletion request, update a metadata to delete a link relationship between the existing file and a corresponding virtual file.

15. The system according to claim 9, wherein the instructions further cause the processing unit to:
 determine whether the request relates to an addition of a new file to the policy aware unified file system:
 when the request relates to the addition of the new file to the policy aware unified file system:
  obtain from the unification policy, a branch that the file is to be added to;
  determine whether the addition of the new file satisfies the unification policy and a branch policy of the branch that the file is to be added to, and
  when the addition of the new file satisfies the unification policy and the branch policy of the branch that the file is to be added to:
   add the file to the branch;
   create a virtual file in the policy aware unified file system for the file to be added to the branch; and
   apply the branch policy of the branch and the unification policy to the virtual file.

16. The system according to claim 9, further comprising a lazy creation optimization process when a software application accesses a file in the policy aware unified file system, wherein the lazy creation optimization process includes instructions that cause the processing unit to:
 determine whether the request relates to an access of an existing file in the policy aware unified file system;
 when the request does not relate to the access of the existing file, determine whether the file exists in a branch file system;
 when the file is determined to exist in the branch file system, determine whether unifying the file into the policy aware unified file system satisfies both the unification policy and a branch policy; and
 when unifying the file into the policy aware unified file system satisfies both the unification policy and the branch policy, create a virtual file in the policy aware unified file system for the file.

17. A non-transitory machine readable storage medium having stored thereon processor executable instructions which, when executed by a processor, cause the processor to control a system to perform a method of operating a policy aware unified file system of a computer system, the method comprising:
 unifying existing branches which are located in a group of separate file systems in the computer system to create the policy aware unified file system wherein the policy aware unified file system includes branch policies of the unified existing branches and a unification policy of the policy aware unified file system, and wherein each file system in the group of separate file systems is considered a branch, and wherein the unification policy comprises a file that is located at a different physical location within the computer system from the location of the unified existing branches, and
  wherein the policy aware unified file system is created at a different physical location within the computer system from the location of the unified existing branches;
  wherein each branch policy of each unified existing branch is located at its respective branch;
  wherein the virtual branch policies of the unified existing branches are located at the different physical location;
 receiving a request from an application to access the policy aware unified file system;
 determining whether the request satisfies the unification policy and a corresponding branch policy; and
 in response to the request satisfying the unification policy and the corresponding branch policy, allowing the application to access the policy aware unified file system.

18. The non-transitory machine readable storage medium according to claim 17, wherein the unifying the existing branches in the computer system to create the policy aware unified file system comprises:
 selecting a branch from the existing branches in the computer system;
 retrieving a branch policy associated with the selected branch and retrieving the unification policy associated with the policy aware unified file system;
 creating virtual files in the policy aware unified file system for files in the selected branch, wherein each created virtual file corresponds to a file in the selected branch; and
 applying the retrieved branch policy associated with the selected branch and the retrieved unification policy to all the virtual files created for the files in the selected branch.

* * * * *